(12) United States Patent
Xu et al.

(10) Patent No.: US 10,033,629 B2
(45) Date of Patent: Jul. 24, 2018

(54) SWITCH, DEVICE AND METHOD FOR CONSTRUCTING AGGREGATED LINK

(71) Applicant: Lenovo Enterprise Solutions (Singapore) Pte. Ltd., Singapore (SG)

(72) Inventors: Qiaorong Xu, Wuxi (CN); Bo Wang, Shanghai (CN); Tao Pu, Jiang SU (CN); Guanghui Chen, Wuxi (CN)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 94 days.

(21) Appl. No.: 15/163,973

(22) Filed: May 25, 2016

(65) Prior Publication Data
US 2016/0380801 A1    Dec. 29, 2016

(30) Foreign Application Priority Data

Jun. 24, 2015  (CN) .......................... 2015 1 0353530

(51) Int. Cl.
| | |
|---|---|
| *H04L 12/709* | (2013.01) |
| *H04L 12/891* | (2013.01) |
| *H04L 12/803* | (2013.01) |
| *H04L 12/743* | (2013.01) |

(52) U.S. Cl.
CPC .......... *H04L 45/245* (2013.01); *H04L 47/125* (2013.01); *H04L 47/41* (2013.01); *H04L 45/7453* (2013.01); *Y02B 60/33* (2013.01); *Y02D 50/30* (2018.01)

(58) Field of Classification Search
None
See application file for complete search history.

(56) References Cited

U.S. PATENT DOCUMENTS

| | | | | |
|---|---|---|---|---|
| 9,473,382 | B2* | 10/2016 | Said .......................... | H04L 45/00 |
| 2005/0198371 | A1* | 9/2005 | Smith ....................... | H04L 45/02 |
| | | | | 709/238 |
| 2006/0251074 | A1* | 11/2006 | Solomon .................. | H04L 45/04 |
| | | | | 370/392 |
| 2007/0002826 | A1* | 1/2007 | Bennett ................... | H04L 41/0806 |
| | | | | 370/351 |
| 2007/0183313 | A1* | 8/2007 | Narayanan ............. | H04L 49/357 |
| | | | | 370/216 |
| 2014/0198656 | A1* | 7/2014 | Venkatesh .............. | H04L 47/125 |
| | | | | 370/235 |

* cited by examiner

*Primary Examiner* — Brian Roberts
(74) *Attorney, Agent, or Firm* — Jeffrey L. Streets (57) ABSTRACT

A switch, a device and a method for constructing an aggregated link are provided. A switch for constructing an aggregated link with multiple peer devices is provided. The switch includes multiple ports supporting different connection protocols, with each port being used for connecting to a peer device. The switch further includes a sub-aggregated link constructing unit used for aggregating one or more ports running the same protocol in the switch into a sub-aggregated link, and a control unit used for forming an aggregated link from all the sub-aggregated links.

20 Claims, 6 Drawing Sheets

SWITCH, DEVICE AND METHOD FOR CONSTRUCTING AGGREGATED LINK

CROSS-REFERENCE TO RELATED APPLICATIONS

This application claims priority under 35 U.S.C. § 119 to Chinese Patent Application No. 201510353530.9 filed on Jun. 24, 2015, the entire text of which is specifically incorporated by reference herein.

BACKGROUND

Field of the Invention

The present invention generally relates to network connection technologies.

Background of the Related Art

In current networking technologies, there has been an explosive growth of commercial information exchange requests that the network must be capable of providing at a high access bandwidth, performance and redundancy. An aggregated link may be used to provide a higher link bandwidth, improved link transmission flexibility, and greater redundancy, and has become an important technology in network connections.

Figure 1:
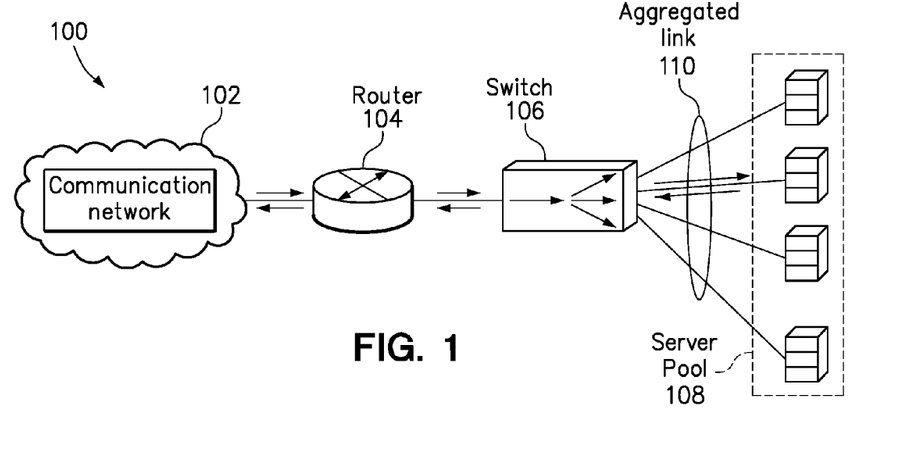
FIG. 1 is a diagram of a typical network connection topological structure.

FIG. 1 shows a typical network connection topological structure 100. The network connection topological structure 100 includes a communication network 102, a router 104, a switch 106 and a server pool 108. The communication network 102 is a medium used for implementing communication. For example, the communication network 102 may include (but is not limited to) the Internet, a cloud network, a wireless network (Wi-Fi), a wireless local area network (WLAN), a local area network (LAN), a plain old telephone service (POTS) and/or a metropolitan area network (MAN). The devices in the network connection topological structure 100 may be connected to the communication network 102 according to various wired and wireless communication protocols. The router 104 is used for searching for an optimal transmission path for a data frame passing through the router 104, and effectively transmitting the data to a destination site. The switch 106 includes multiple physical ports respectively used for connecting each server in the server pool 108 as a peer.

To implement load sharing of inlet/outlet traffic in member ports, the multiple physical switch ports of the switch 106 may be bound together to form a logical port, so as to be connected to the server pool 108. This logical port of multiple physical ports is referred to as an aggregated link (trunk), and is represented as an aggregated link 110 in FIG. 1. In use of the aggregated link 110, the switch 106 may determine, according to a port load sharing strategy configured by a user, from which member port a packet is sent to the peer server.

In use of the aggregated link 110, the switch 106 may further work in a dispatched mode, and load balancing is performed between the servers in a manner such as MAC exchange. The dispatched mode requests that the server supports a hybrid traffic access; however, this can provide a magnificent traffic exchange, for example, for some time-critical cloud services. The aggregated link can reduce the load of the switch and provide a line-rate hash distribution, and can provide a shorter waiting time, and higher bandwidth and redundancy.

In the typical network connection of topological structure 100 shown in FIG. 1, the peer device is multiple servers in the server pool 108, but the peer device may also be multiple other switches. As shown in FIG. 1, in the link aggregation technology, the aggregated link generally needs to be connected between multiple peer devices (switches or servers), or even between peer devices (switches or servers) of multiple manufacturers. However, devices of different manufacturers may run different protocols. Currently, it cannot be supported to establish an aggregated link between a switch and multiple peer devices running different protocols. Therefore, a user may be limited when buying a switch or server used as a peer, and the user has to buy products of a single manufacture to avoid problems arising from incompatible protocols. Therefore, a new network connection technology is needed to solve the protocol compatibility problem of peer devices from different manufacturers.

BRIEF SUMMARY

One embodiment of the present invention provides a switch for constructing an aggregated link with multiple peer devices. The switch comprises multiple ports supporting different connection protocols, with each port being used for connecting to one peer device. The switch further comprises a sub-aggregated link constructing unit used for aggregating one or more ports running the same protocol into a sub-aggregated link, and a control unit used for forming an aggregated link from all the sub-aggregated links.

Another embodiment of the present invention provides a device for connecting to a switch, wherein the switch includes multiple ports supporting different connection protocols, with each port being used for connecting to one peer device. The device comprises a sub-aggregated link constructing unit used for aggregating one or more ports running the same protocol in the switch into a sub-aggregated link, and a control unit used for forming an aggregated link from all the sub-aggregated links.

A further embodiment of the present invention provides a method for constructing an aggregated link. The method comprises configuring multiple ports of a switch supporting different connection protocols, with each port being used for connecting to one peer device. The method further comprises aggregating one or more ports running the same protocol in the switch into a sub-aggregated link, and forming an aggregated link from all the sub-aggregated links.

BRIEF DESCRIPTION OF THE SEVERAL VIEWS OF THE DRAWINGS

By considering the following description made in conjunction with the accompanying drawings, the structures, operations and advantages of the present invention may be better understood. The accompanying drawings are exemplary rather than limiting of the present invention. In some of the accompanying drawings, for clarity of illustration, specific elements may be omitted or shown non-proportionally. Generally, similar elements are presented by using similar numerals in different accompanying drawings. Moreover, for clarity, some reference numerals may be omitted in specific drawings.

DETAILED DESCRIPTION

Various embodiments of the present invention including forming a nested aggregated link, such that a switch can be connected to multiple peer devices (servers or other switches) running different protocols. For example, the switch may support connections with peer devices of multiple manufacturers at the same time.

One embodiment of the present invention provides a switch for constructing an aggregated link with multiple peer devices. The switch comprises multiple ports supporting different connection protocols, with each port being used for connecting to one peer device. The switch further comprises a sub-aggregated link constructing unit used for aggregating one or more ports running the same protocol into a sub-aggregated link, and a control unit used for forming an aggregated link from all the sub-aggregated links.

According to an embodiment of the present invention, the switch may further comprise multiple protocol control units, wherein each protocol control unit corresponds to one sub-aggregated link and is used for running a protocol of the corresponding sub-aggregated link and controlling a protocol exchange between the corresponding sub-aggregated link and the peer device.

According to an embodiment of the present invention, the switch may further comprise a basic running unit used for storing a port member list of the aggregated link and information of hash control during running.

According to an embodiment of the present invention, the hash control during running is selected from a single-layer hash control and a multi-layer hash control.

According to an embodiment of the present invention, the switch may further comprise a configuring unit used for configuring a port member set of the switch and a protocol run by each port, so that the sub-aggregated link constructing unit may aggregate one or more ports running the same protocol into a sub-aggregated link.

According to an embodiment of the present invention, the peer device may be a switch or a server.

According to an embodiment of the present invention, the switch may be a physical switch or a virtual switch.

According to an embodiment of the present invention, when one of the multiple peer devices fails, the protocol control unit of the sub-aggregated link where the failed peer device is located is configured to perform a protocol exchange with the failed peer device, and notifies the failure to the control unit. The control unit is configured to rewrite a port member list of the aggregated link and information of a hash control during running, and to notify the basic running unit of the rewritten port member list and information of the hash control during running, in response to the received notification from the protocol control unit. The basic running unit is configured to remove a connection with the failed peer device and run a new hash control, in response to the received notification from the control unit.

According to an embodiment of the present invention, after one of the multiple peer devices has recovered from a failure, the protocol control unit of the sub-aggregated link where the peer device recovered from the failure is located is configured to perform a protocol exchange with the peer device, and notify the control unit of the failure recovery. The control unit is configured to rewrite a port member list of the aggregated link and information of a hash control during running, and notify the basic running unit of the rewritten port member list and information of the hash control during running, in response to the received notification from the protocol control unit. The basic running unit is configured to re-add a connection with the peer device recovered from the failure and run a new hash control, in response to the received notification from the control unit.

Another embodiment of the present invention provides a device for connecting to a switch, wherein the switch includes multiple ports supporting different connection protocols, with each port being used for connecting to one peer device. The device comprises a sub-aggregated link constructing unit used for aggregating one or more ports running the same protocol in the switch into a sub-aggregated link, and a control unit used for forming an aggregated link from all the sub-aggregated links.

A further embodiment of the present invention provides a method for constructing an aggregated link. The method comprises configuring multiple ports of a switch supporting different connection protocols, with each port being used for connecting to one peer device. The method further comprises aggregating one or more ports running the same protocol in the switch into a sub-aggregated link, and forming an aggregated link from all the sub-aggregated links.

Examples of protocols that may be used are described in brief before specific embodiments of the present invention are described in detail. (1) "Static Port channel" is a mature aggregated link protocol that is able to aggregate multiple physical ports into one logic port without the need of performing protocol exchange with a peer device or server. However, the protocol of static port channel does not support dynamic logic link connection detection. (2) "Link access control protocol" (LACP) can meet requirements of a user on logic link connection detection of an aggregated link or even a distributed aggregated link. However, the LACP requests that a peer end must use the same logic or the same physical switch or server. For a logical peer switch, this means that the server must support distributed LACP on a virtual switch or a virtual machine (VM), which can be complicated and expensive. Moreover, this may be difficult to implement for servers of different manufacturers. In an actual use, any of a number of variations of the LACP may further be used.

In addition to the two commonly used standard protocols and variations thereof, many non-standard private protocols may also being used, such as vPC (virtual port channel) of Cisco, vLAG (virtual lag) of IBM, and Flex-links. The vPC, vLAG and Flex-links are all active/active or active/passive connection solutions. They are applicable to support a distribution aggregated link connection between not more than two physical servers. The vPC and vLAG further request that a connected server must be a vPC or vLAG peer device, and they cannot support a closed loop solution implemented by multiple manufacturers.

Embodiments for practicing the present invention will now be described in detail with reference to the accompanying drawings. It should be pointed out that the embodiments of the present invention will be mainly described by using a physical switch as an example. However, a person skilled in the art should understand that the present invention is not limited thereto. For example, embodiments of the present application are also applicable to a virtual switch.

In the context of the present invention, a device (for example, a server or another switch) with which a switch intends to establish an aggregated link is referred to as a "peer device." Furthermore, embodiments of the present invention will be described mainly by using a server as a peer device. However, a person skilled in the art should understand that the present invention is not limited to a server as a peer device. For example, the present invention is applicable to an aggregated link connection between a switch and any peer device (such as a physical switch, a virtual switch, and a personal computer) that can support an aggregated link.

In addition, embodiments of the present invention will be described mainly by using protocols, such as the LACP and the static port channel as examples. However, a person skilled in the art should understand that embodiments of the present invention are not related to a running protocol.

Figure 2:
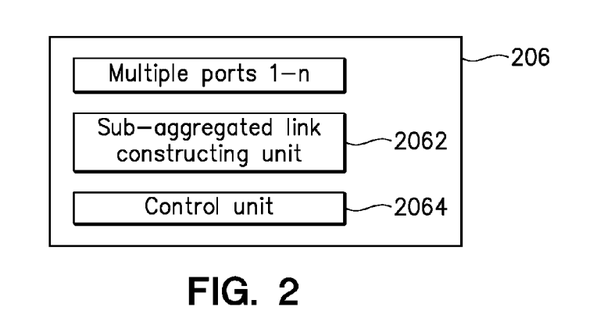
FIG. 2 is a schematic structural block diagram of a switch according to an embodiment of the present invention.

FIG. 2 is a schematic structural block diagram of a switch 206, according to an embodiment of the present invention. As shown in FIG. 2, the switch 206 includes multiple ports 1-n (i.e., 1 through n), a sub-aggregated link constructing unit 2062 and a control unit 2064.

The multiple ports 1-n of the switch 206 support different connection protocols, and each port is used for connecting to one of multiple peer devices (for example, servers or other switches). Here, the connection protocol may include the static port channel protocol, the LACP protocol and variations thereof, and Cisco vPC, IBM vLAG and the like as described above.

The sub-aggregated link constructing unit 2062 binds one or more ports running the same protocol in the switch together to from a logical port, so as to construct a sub-aggregated link. The present invention can run in an environment including many (for example, at least two) protocols, and therefore, for example, at least two sub-aggregated links may be formed.

The control unit 2064 constructs all sub-aggregated links into an aggregated link (that is, a nested aggregated link). The nested aggregated link in the present invention may be considered as an aggregated link group.

Figure 3:
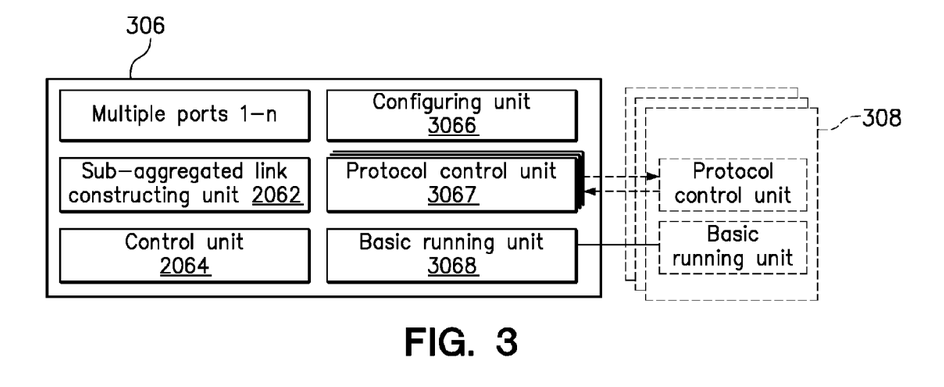
FIG. 3 is a schematic structural block diagram of a switch according to another embodiment of the present invention.

FIG. 3 is a schematic structural block diagram of a switch 306 according to another embodiment of the present invention. Compared with the switch 206 shown in FIG. 2, in addition to the multiple ports 1-n, the sub-aggregated link constructing unit 2062 and the control unit 2064, the switch 306 shown in FIG. 3 further includes a configuring unit 3066, multiple protocol control units 3067, and a basic running unit 3068. Here, parts in FIG. 3 identical to parts in FIG. 2 are not repeated herein, and merely parts in FIG. 3 different from FIG. 2 are described.

The configuring unit 3066 is used for configuring a port member set of the switch 306 and a protocol run by each port. After configuring each port, the configuring unit 3066 delivers an aggregated link port member list to the sub-aggregated link constructing unit 2062, so as to construct the sub-aggregated links, and delivers the aggregated link port member list to the control unit 2064 so that the control unit 2064 performs control and update. The aggregated link port member list is further delivered to the basic running unit 3068 for storage, as described in the following.

As required, the configuring unit 3066 may further configure parameters related to protocols, and perform verification to check whether each physical port can be configured to the aggregated link. This verification generally means that a physical port that may be added to the aggregated link has the same bandwidth, flow control, duplexing/semi-duplexing, VLAN configuration thereof and the like as other physical ports that have existed in the aggregated link. That is to say, a condition of whether a new physical port can be added to the aggregated link is checked. This configuration operation may be implemented by, for example, programming.

FIG. 3 shows that the configuring unit 3066 is located in the switch 306. However, the configuring unit 3066 to be located elsewhere, such as being located in a control panel (not shown), located in an SDN controller (not shown) based on a server, located in a cloud, or located on the server side. The control panel and the SDN controller are generally both third-party servers, and the server runs control software of SDN to control protocol running of other network switches.

The switch 306 is provided with a plurality of protocol control units 3067, each protocol control unit 3067 corresponding to a sub-aggregated link. The protocol control units 3067 are used for running the protocol of the sub-aggregated link and controlling the sub-aggregated link to perform protocol exchange with an associated peer device. Each protocol control unit 3067 exchanges a protocol message with the peer device, so that each sub-aggregated link can run its own link protocol, which is conducive to formation or disconnection of the sub-aggregated link, as described in the following.

The basic running unit 3068 stores the aggregated link port member list (that is, the switch ports 306) and information of a hash control (that is, traffic distribution) during running, so as to determine which hash algorithm is used and on which port members the hash algorithm is performed. The basic running unit 3068 may be implemented through hardware (for example, an ASIC), and may also be implemented through software.

The hash control may be generated automatically by the basic running unit 3068 through hardware programming according to the aggregated link member list, and may also be generated by the control unit 2064, so as to implement traffic balancing in the aggregated link, thereby fully using resources of each link. Specifically, through the hash control, at the server side, each server connected to the sub-aggregated link performs local traffic balancing on outlet traffic of the server between the sub-aggregated links, and on the switch side, the nested aggregated link can perform local balancing between all ports forming the aggregated link.

In addition, the hash control is not limited to a single-layer hash control on all physical ports forming the nested aggregated link, but a hash control may further be performed at the sub-aggregated link level and inside the sub-aggregated link, thereby implementing multi-layer hash control. The multi-layer hash control is more complicated, but can provide greater flexibility for the traffic control.

In FIG. 3, a server 308 (shown by dashed lines) performs interaction with the switch side through a protocol control unit and a basic running unit thereof. The protocol control unit and the basic running unit are standard configurations for an existing server, and may be implemented by software or hardware. It can be seen that the present invention can be implemented without the need of additionally configuring the server. In addition, each server only needs to form and maintain its own sub-aggregated link or port connection, but does not need to be synchronous with other servers, and therefore, the implementation of the server is simplified as much as possible.

Figure 4:
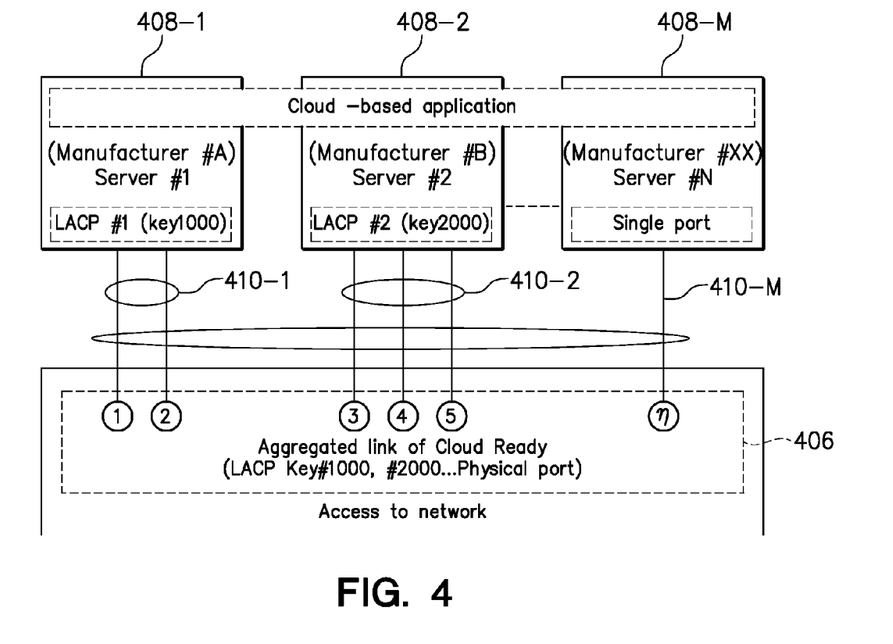
FIG. 4 shows a schematic diagram of a nested aggregated link between a switch and a server pool according to an embodiment of the present invention.

FIG. 4 shows a schematic example of forming a nested aggregated link between a switch and a server pool according to an embodiment of the present invention. As shown in FIG. 4, at the server side, servers 408-1, 408-2 through 408-M (where M is an integer schematically presenting the number of the servers) are shown schematically. It is assumed that the servers 408-1, 408-2 through 408-M come from multiple different manufacturers (that is, a multi-manufacturer server environment). An application runs on the servers of multiple manufacturers. Here, it is schematically shown that the application is a cloud-based application, but the present invention is not limited thereto, and the application may be any suitable application.

A switch 406 includes multiple physical ports 1-n (i.e., 1 through n). A configuring unit (not shown; but see FIG. 3) of the switch 406, for example, configures the ports 1 and 2 of the switch 406 to run a standard LACP protocol key 1000, configures the ports 3 through 5 to run an LACP key 2000 protocol, and configures the port n to run a Cisco vPC protocol.

Thereafter, a sub-aggregated link constructing unit (not shown; but see FIG. 3) of the switch 406 binds the ports 1 and 2 into a logic link to form a sub-aggregated link 410-1, so as to form two physical links between it and a server 408-1 that also runs, for example, the standard LACP protocol key 1000. The sub-aggregated link constructing unit (not shown) of the switch 406 further binds the ports 3 to 5 into a logic link to form a sub-aggregated link 410-2, so as to form three physical links between it and a server 408-2 that also runs, for example, the LACP key 2000 protocol. The sub-aggregated link constructing unit (not shown) of the switch 306 also binds the port n into a logic link to form a sub-aggregated link 410-M, so as to form a single physical link between it and a server 408-M that also runs, for example, the Cisco vPC protocol.

A control unit (not shown; but see FIG. 3) of the switch 306 aggregates the sub-aggregated links 410-1, 410-2 through 410-M together, so as to form a nested aggregated link (collectively referred to as an aggregated link 410).

Each time when a sub-aggregated link is formed or disconnected or the sub-aggregated link has any other change, a protocol control unit corresponding to the sub-aggregated link having the change generates a message to notify the control unit, so that the control unit controls removal or addition of all or some changed ports, as described in the following.

In the above descriptions, it is shown that one sub-aggregated link corresponds to one server. However, a person skilled in the art will understand that the present invention is not limited thereto. One sub-aggregated link may correspond to multiple servers, as long as the multiple servers run the same protocol (for example, it is so in a case of a distributed virtual switch). In addition, for different sub-aggregated links, protocols thereof may be different or can be distinguished from each other. For example, for the sub-aggregated links 410-1 and 410-2, they all run LACP protocols, but the sub-aggregated link 410-1 runs the LACP key #1000, and the sub-aggregated link 410-2 runs the LACP key #2000, so that the two sub-aggregated links run different types of protocols.

An embodiment of controlling on the switch side to form a nested aggregated link has been described with reference to FIG. 2 to FIG. 4. However, the present invention is not limited thereto, and control may be performed at a third-party device or at a server side to form a nested aggregated link.

Figure 5:
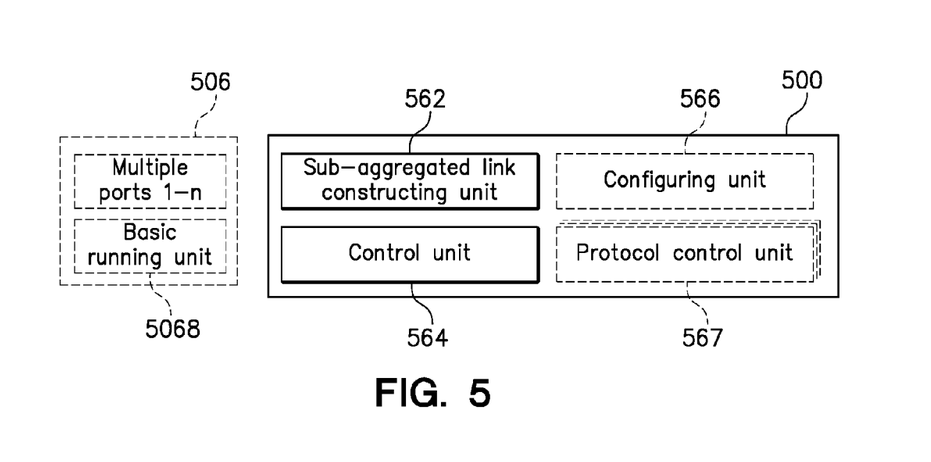
FIG. 5 is a schematic structural block diagram of forming a nested aggregated link by performing control in a third-party device according to an embodiment of the present invention.

FIG. 5 is a schematic structural block diagram of forming a nested aggregated link by performing control in a third-party device 500 according to an embodiment of the present invention is shown. As shown in FIG. 5, the third-party device 500 includes a sub-aggregated link constructing unit 562 and a control unit 564. The sub-aggregated link constructing unit 562 is used for binding one or more ports running the same protocol in a switch into a logical port according to pre-configured protocols run in the switch ports, so as to construct a sub-aggregated link. As described above, in the embodiment of the present invention, at least two protocols are used, and therefore, for example, at least two sub-aggregated links are constructed. The control unit 564 constructs all sub-aggregated links into an aggregated link (that is, a nested aggregated link).

In addition to the sub-aggregated link constructing unit 562 and the control unit 564, the third-party device 500 shown in FIG. 5 may further include a configuring unit 566 and multiple protocol control units 567 as required, as shown by dashed blocks in FIG. 5. The configuring unit 566 is used for configuring a port member set of the switch and a protocol run by each port. As required, the configuring unit 566 may further configure parameters related to protocols. This configuration operation may be implemented by, for example, programming. After configuring the switch ports, the configuring unit 566 delivers an aggregated link port member list to the sub-aggregated link constructing unit 562 and the control unit 564, so that the sub-aggregated link constructing unit 562 constructs the sub-aggregated links, and the control unit 564 performs control and update. The aggregated link member list is further delivered to the basic running unit of the switch for storage, as described in the following.

FIG. 5 shows that the configuring unit 566 is located in the third-party device 500. However, the configuring unit 566 may be located elsewhere, such as being located in a control panel (not shown), located in an SDN controller (not shown) based on a server, or located on the switch side. The control panel or SDN controller here may be any device that can control the switch, for example, it may be a third-party server, that is, an independent computer, which may be a unique computer served as a dedicatedly designed network controller (or referred to as a control panel), or may be a server running SDN control software, for example, running openflow control software, or even may be a virtual computer.

The third-party device 500 is provided with a plurality of protocol control units 567, each protocol control unit corresponding to a sub-aggregated link. Each protocol control unit is used for running the protocol of the sub-aggregated link and controlling the sub-aggregated link to perform protocol exchange with the peer device. Each protocol control unit 567 exchanges a protocol message with the peer device, so that each sub-aggregated link can run its own link protocol, which is conducive to formation or disconnection of the sub-aggregated link, as described in the following.

In the embodiment shown in FIG. 5, the control of the aggregated link is delivered to the third-party device 500, so that the switch 506 shown by a dashed block may only possess a simple configuration. However, the basic running unit 5068 is still located in the switch 506, and is used for storing the aggregated link member list (that is, switch ports) and the information of the hash control (that is, traffic distribution) during running that are transmitted from the configuring unit 566. The basic running unit may be implemented through hardware (for example, an ASIC), and may also be implemented through software.

Each time a sub-aggregated link is formed or disconnected or has any other change, a protocol control unit 567 corresponding to the sub-aggregated link having the change generates a message to notify the control unit 564. Therefore, the control unit 564 updates the switch port member list, and notifies the basic running unit 5068 to add or delete the port member having the change.

The hash control may be generated automatically by the basic running unit 5068 through hardware programming according to the aggregated link member list, and may also be generated by the control unit 564, so as to implement traffic balancing in the aggregated link, thereby fully using resources of each link.

In the embodiment shown in FIG. 5, a single-layer or multi-layer hash control on the aggregated link may be implemented.

The third-party device 500 may use a server running switch management software, for example, an openstack controller, SNSC, IMBFSM, Lenovo, or the like.

In addition, a person skilled in the art can understand that one server in the multiple peer servers with which the switch is intended to establish an aggregated link may serve as the third-party device. In this case, before negotiation of the nested aggregated link, another link needs to be constructed additionally, so that the server can communicate with the switch.

Figure 6:
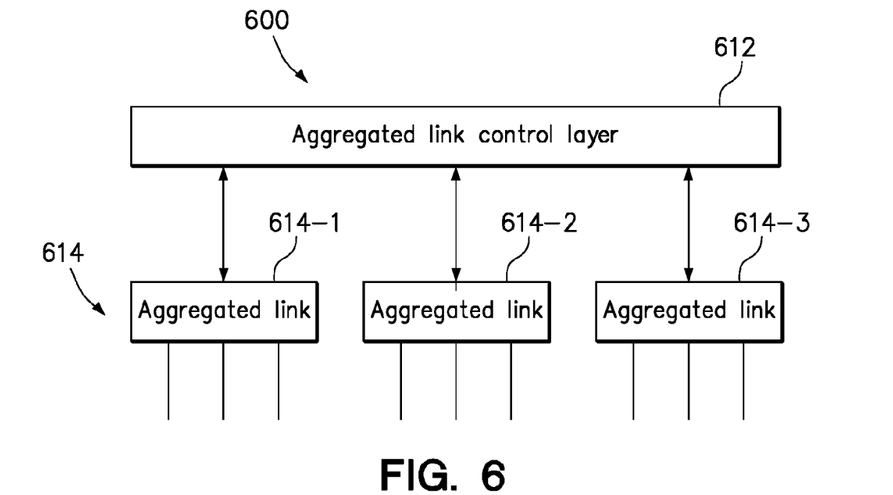
FIG. 6 is a schematic logic structural diagram of an aggregated link according to an embodiment of the present invention.

FIG. 6 is a schematic logic structural diagram of an aggregated link according to an embodiment of the present invention. As shown in FIG. 6, in logic, the aggregated link 600 according to the embodiment of the present invention includes two layers, an aggregated link control layer 612 and a sub-aggregated link layer 614. In FIG. 6, three sub-aggregated links 614-1, 614-2 and 614-3 are shown schematically. However, a person skilled in the art will understand that the number of the sub-aggregated links in the present invention is not limited thereto, and that sub-aggregated links of any number may be configured according to actual requirements.

According to an embodiment of the present invention, the aggregated link control layer 612 may include, for example, the sub-aggregated link constructing unit 2062 (see FIG. 2), the control unit 2064 (see FIG. 2), the configuring unit 3066 (see FIG. 3) and the basic running unit 3068 (see FIG. 3). Each of the sub-aggregated links 614-1, 614-2 and 614-3 includes a corresponding protocol control unit 3067 (see FIG. 3) responsible for running a protocol thereof.

According to another embodiment of the present invention, the aggregated link control layer 612 may include, for example, the sub-aggregated link constructing unit 562, the control unit 564, the configuring unit 566 and the basic running unit 5068 as shown in FIG. 5. Each of the sub-aggregated links 614-1, 614-2 and 614-3 includes a corresponding protocol control unit 567 (see FIG. 5) responsible for running a protocol thereof.

Figure 7:
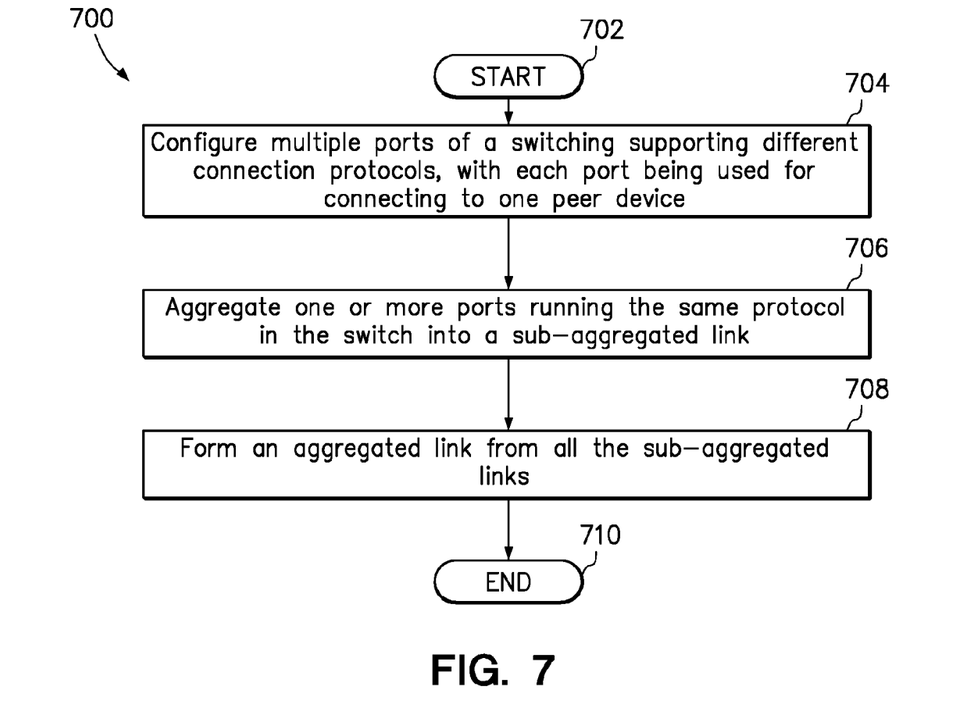
FIG. 7 is a flowchart of a method for forming an aggregated link.

FIG. 7 is a flowchart of a method 700 for forming an aggregated link.

In step 702, the method starts.

In step 704, multiple ports supporting different connection protocols of a switch are configured, each port being used for connecting to one peer device. Here, the protocol may include multiple protocols as described above. The peer device may be a server or another switch.

In step 706, one or more ports running the same protocol in the switch are bound into a logical port, so as to construct a sub-aggregated link. The present invention can run in an environment including many (for example, at least two) protocols, and therefore, for example, at least two sub-aggregated links may be formed.

In step 708, all sub-aggregated links are constructed into an aggregated link (that is, a nested aggregated link). The method then ends in step 710.

As previously indicated, the method 700 shown in FIG. 7 may be executed by the switch, executed by a third-party device, or executed by one of multiple servers connected to the switch.

Operations performed when a sub-aggregated link changes (disconnected or added) will be described with reference to FIG. 8 and FIG. 9.

Figure 8:
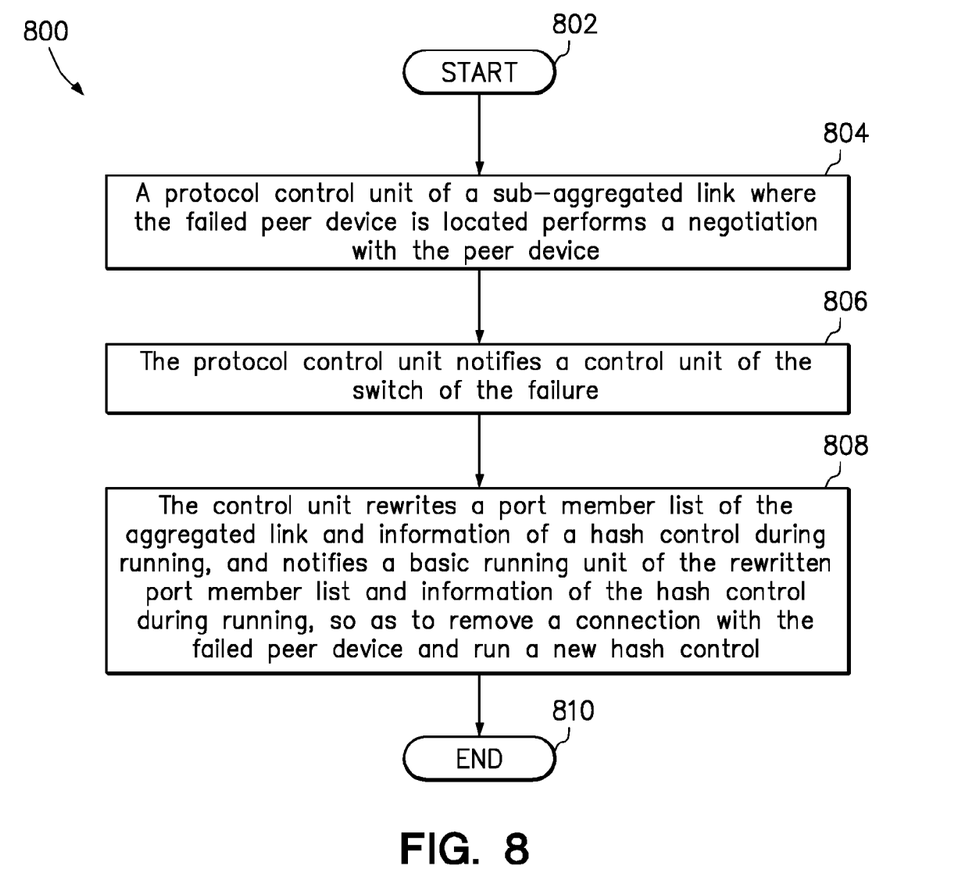
FIG. 8 is a flowchart of a method when a failure occurs in a peer server to disconnect a certain link after an aggregated link is formed.

FIG. 8 is a flowchart of a method 800 when a certain sub-aggregated link is disconnected due to a failure occurred in one of multiple peer servers after an aggregated link is formed. The method starts from step 802, and in step 804, when it is detected that a certain link is disconnected due to a failure occurred in a peer device, a protocol control unit of a sub-aggregated link where the failed peer device is located performs a negotiation with the peer device. In step 806, the protocol control unit notifies the failure to a control unit of the switch. In step 808, the control unit rewrites a port member list of the aggregated link and information of a hash control during running, and notifies a basic running unit of the rewritten port member list and information of the hash control during running, so that the basic running unit removes a connection with the failed peer device and runs a new hash control. Then, the method ends at step 810.

Figure 9:
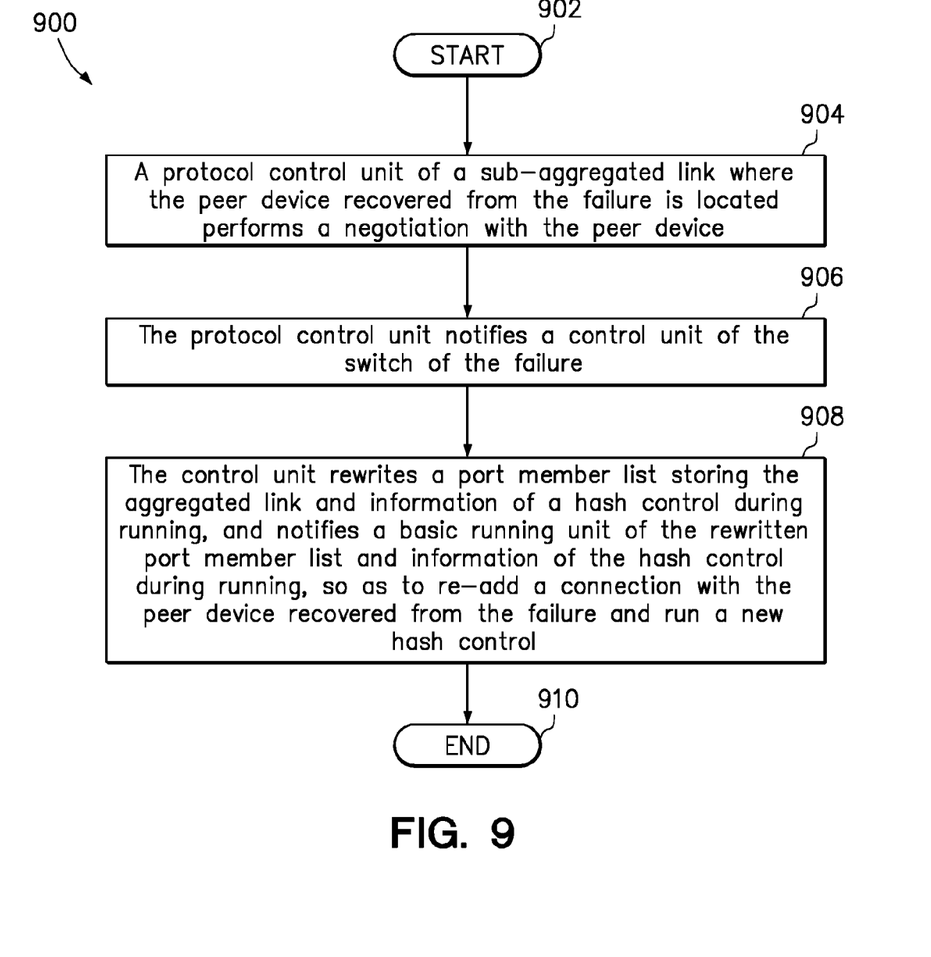
FIG. 9 is a flowchart of a method of re-adding an aggregated link after a failure recovery of a peer server.

FIG. 9 is a flowchart of a method 900 of re-adding an aggregated link after a failure recovery of one of multiple peer servers. The method starts from step 902, and in step 904, when it is detected that a failed server is repaired, a protocol control unit of a sub-aggregated link where the peer device recovered from the failure is located performs a negotiation with the peer device. Therefore, in step 906, the protocol control unit notifies the failure recovery to a control unit of the switch. In step 908, the control unit rewrites a port member list storing the aggregated link and information of a hash control during running, and notifies a basic running unit of the rewritten port member list and information of the hash control during running, so as to re-add a connection with the peer device recovered from the failure and run a new hash control. The method ends at step 910.

Moreover, a person skilled in the art can understand that in the methods shown in FIG. 8 and FIG. 9, when a port member changes (for example, the port is deleted or added), the control unit 2064 or the control unit 564 may merely rewrite or refresh a port member list of an affected sub-aggregated link, and therefore, data streams of other sub-aggregated links will not be affected. But the control unit 2064 or the control unit 564 may also refresh the member list of the whole aggregated link, this being simple and easy to implement.

The nested aggregated link is a simple and flexible distributed aggregated link solution, and is conducive to forming an aggregated link connection between multiple servers. At the same time, cloud implementation and maintenance may also be simplified. The nested aggregated link implements aggregated link control on sub-aggregated links, and simplifies the implementation of the server, without the need of any distributed aggregated link protocol, so that various implementations including the cloud implementation is as simple and low in cost as possible. The nested aggregated link supports protocol compatibility between servers of multiple manufacturers, and therefore, a user will not be trapped therein. Furthermore, the nested aggregated link has no limitation on the number of the connected servers.

By means of the nested aggregated link mechanism of the present invention, the control unit (for example, the control unit 2064 shown in FIG. 2 and FIG. 3, and the control unit 564 shown in FIG. 5) can control all sub-aggregated links. Moreover, the control unit does not need to run any other complicated aggregated link control protocol, and makes the complicated sub-aggregated link protocol transparent, so as to provide a simple single-logic aggregated link for an upper-layer protocol or application.

According to the embodiment of the present invention, different sub-aggregated links run different sub-aggregated link protocols, and therefore, the control unit does not need to run protocol exchange of each sub-aggregated link. Each sub-aggregated link can run and maintain a protocol directed to a server connected thereto, and does not need to perform protocol exchange to be synchronized with other sub-aggregated links (connected to other servers or servers of other manufacturers), or depend on the protocol exchange with other sub-aggregated links (connected to other servers or servers of other manufacturers). This mechanism ensures that each server only needs to run a protocol thereof independently with a sub-aggregated link connected thereto, and does not need to support a distributed aggregated link protocol or any cooperation of multiple servers or multiple manufacturers. For example, for the Cloud Ready technology becoming popular, this also ensures simplicity and can support multiple manufacturers.

It can be seen that, according to embodiments of the present invention, on the switch side, by aggregating physical links having the same protocol in connection between switch ports and the server into a sub-aggregated link, all switch ports are enabled to form an isomeric aggregated link (or a nested aggregated link). By aggregating all switch ports into a single-logic aggregated link, distributed aggregated link connection, load balancing, and supporting on connection of multi-manufacturer servers can be provided, without the need of performing complicated protocol control.

Figure 10:
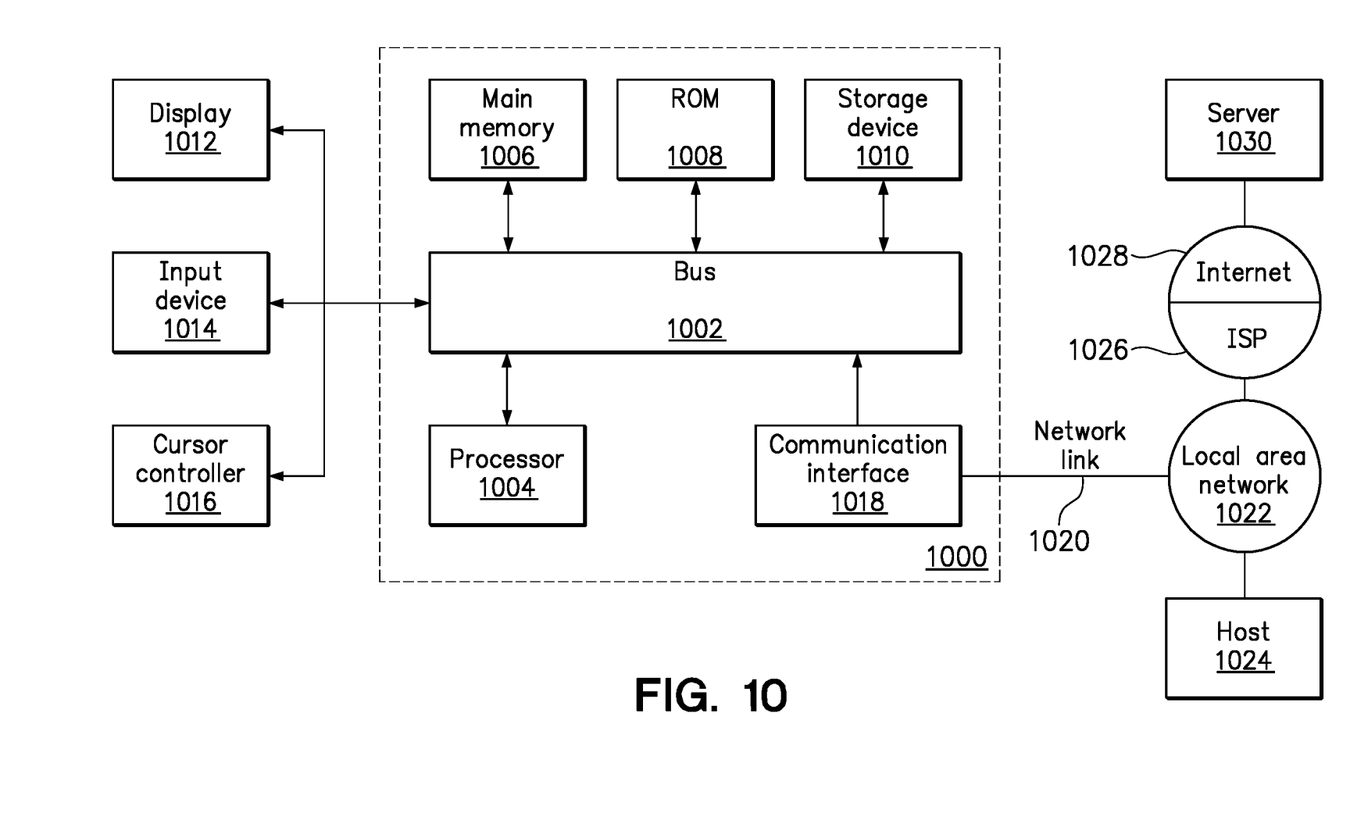
FIG. 10 is a block diagram of a computer system that can implement an embodiment of the present invention.

Referring to FIG. 10, a block diagram 1000 of a computer system that can implement an embodiment of the present invention is shown.

According to an embodiment, the invention may be implemented by using one or more dedicated computing device. The dedicated computing device may be hard-connected to implement the invention, or may include a digital electronic device, for example, one or more application-specific integrated circuits (ASIC) or field-programmable gate arrays (FPGA), the digital electronic device being programmed permanently to implement the invention, or may include one or more general purpose processors, the general purpose processor being programmed to implement the technology according to a program instruction in firmware, a memory, other memories, or a combination thereof. The dedicated computing device may also implement the technology in combination with custom hard-wired logic, an ASIC or FPGA and a custom program. The dedicated computing device may be a desk top computer system, a portable computer system, a hand held device, a networking device, or any other device including hard-wired and/or programmed logic to implement the invention.

The computer system 1000 includes a bus 1002 or another communication mechanism used for transmitting information, and a hardware processor 1004 coupled to the bus 1002 and used for processing the information. For example, the hardware processor 1004 may be a general-purpose microprocessor.

The computer system 1000 further includes a main memory 1006 coupled to the bus 1002 and used for storing the information and an instruction executed by the processor 1004, for example, a random access memory (RAM) or other dynamic storage devices. The main memory 1006 may also be used for storing temporary variables or other intermediate information during execution of the instruction executed by the processor 1004. When being stored in a storage medium accessible by the processor 1004, the instruction enables the computer system 1000 to become a dedicated machine customized for performing operations designated in the instruction.

The computer system 1000 further includes a read only memory (ROM) 1008 or another static storage device, coupled to the bus 1002 and used for storing static information and instructions for the processor 1004. A storage device 1010 such as a magnetic disk, an optical disc, or flash storage is disposed and coupled to the bus 1002, so as to store information and instructions.

The computer system 1000 may be coupled to a display 1012, for example, a cathode ray tube (CRT), through the bus 1002, so as to display information for a computer user. An input device 1014 including alphanumeric keys and other keys is coupled to the bus 1002, so as to transmit information and a command selection to the processor 1004. Another user input device is a cursor controller 1016, for example, a mouse, a trackball, or a cursor direction key, so as to transmit direction information and a command selection to the processor 1004 and control moving of a cursor on the display 1012.

The computer system 1000 may use customized hard-wired logic, one or more ASICs or FPGAs, firmware and/or program logic that is integrated with the computer system to make the computer system 1000 become a dedicated machine or programs the computer system 1000 into a dedicated machine, so as to implement the invention described herein. According to an embodiment, in response to the processor 1004 executing one or more sequences of one or more instructions included in the main memory 1006, the computer system 1000 executes the invention herein. These instructions may be read from another storage medium, for example, the storage device 1010 into the main memory 1006. The execution of an instruction sequence included in the main memory 1006 causes the processor 1004 to perform the processing steps described herein. In an alternative embodiment, a hard-wired circuit may be used alternatively or integrated with a software instruction.

The term "storage medium" used here refers to any medium that stores data and/or instruction enabling the machine to work in a specific manner. The storage medium may include a non-volatile medium and/or a volatile medium. For example, the non-volatile medium includes an optical disc or a magnetic disk, such as the storage medium 1010. The volatile medium includes a dynamic memory, for example, the main memory 1006. For example, common forms of the storage medium include a floppy disk, a hard disk, a solid state drive, a magnetic tape, or any other magnetic data storage medium, a CD-ROM, any other optical data storage medium, any microporous physical medium having various patterns, a RAM, a PROM, an EPROM, a FLASH-EPROM, an NVRAM, and any other storage chip or cassette magnetic tape.

The storage medium is different from a transmission medium, but can be used together with the transmission medium. The transmission medium participates in information transmission between storage mediums. For example, the transmission medium may include a coaxial cable, a copper wire, and an optical fiber, including a lead constructing the bus 1002. The transmission medium may further adopt acoustic wave or optical wave, for example, in the form of acoustic wave or optical wave generated during radio wave and infrared data communication.

Various forms of mediums may be related to transmitting one or more sequences of one or more instructions to the processor 1004 for execution. For example, an instruction is initially carried by a magnetic disk or solid state drive of a remote computer. The remote computer may load the instruction into a dynamic memory thereof, and send the instruction through a telephone line by using a modem. A local modem of the computer system 1000 receives the data from the telephone line, and converts the data into an infrared signal by using an infrared transmitter. An infrared detector may receive data carried in the infrared signal, and a suitable circuit may put the data on the bus 1002. The bus 1002 transmits the data to the main memory 1006, and the processor 1004 retrieves the instruction from the main memory 1006 and executes the instruction. The instruction received by the main memory 1006 may be stored in the storage device 1010 before or after being executed by the processor 1004, depending on situations.

The computer system 1000 further includes a communication interface 1018 coupled to the bus 1002. The communication interface 1018 provides bi-directional data communication coupled to a network link 1020, and the network link 1020 is connected to a local area network 1022. For example, the communication interface 1018 may be an integrated service digital network (ISDN) card, a cable modem, a satellite modem, or a modem, so as to provide a data communication connection to a telephone line of a corresponding type. For another example, the communication interface 1018 may be a local area network (LAN) card providing a data communication connection to a compatible LAN. A wireless link may also be implemented. In any of the implementations, the communication interface 1018 sends and receives an electrical signal, an electromagnetic signal or an optical signal that carries a digital data stream indicating various types of information.

The network link 1020 generally provides data communication to another data device through one or more networks. For example, the network link 1020 may provide, through the local area network 1022, a connection to a main computer 1024 or a data device operated by an Internet service provider (ISP) 1026. The ISP 1026 further provides a data communication service by using a global packet data communication network which is currently generally referred to as the "Internet" 1028. The local area network 1022 and the Internet 1028 both use electronic signals, electromagnetic signals or optical signals carrying digital data streams. The signals passing through various networks and the signal on the network link 920 and traveling in the computer system 1000 to transmit digital data through the communication interface 1018 are exemplary forms of the transmission medium.

The computer system 1000 may send messages and receive data, including program codes, through a network, the network link 1020 and the communication interface 1018. In the example of the Internet, a server 1030 may transmit codes of a requested application program through the Internet 1028, the ISP 1026, the local area network 1022 and the communication interface 1018. When being received, the received codes may be executed by the processor 1004, and/or be stored in the storage device 1010 or another non-volatile memory, for being subsequently executed.

In the above specification, the embodiments of the present invention are described with reference to numerous specific details and implementations. The scope of the present invention is defined by a group of claims (including any subsequent modification) proposed in the present application. Any definition recorded clearly in a term included in the claims should determine the meaning of using the term in the claims. Therefore, limitations, factors, properties, features, advantages or attributes that are not clearly recorded in the claims should not limit the scope of the claims. Therefore, the specification and the accompanying drawings should be considered as exemplary, and are not intended to limit the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable storage medium(s) may be utilized. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. Furthermore, any program instruction or code that is embodied on such computer readable storage medium (including forms referred to as volatile memory) is, for the avoidance of doubt, considered "non-transitory".

Program code embodied on a computer readable storage medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention may be described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, and/or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored as non-transitory program instructions in a computer readable storage medium that can direct a computer, other programmable data processing apparatus, or other devices to function in a particular manner, such that the program instructions stored in the computer readable storage medium produce an article of manufacture including non-transitory program instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A switch for constructing an aggregated link with multiple peer devices, the switch comprising:
   multiple ports supporting different connection protocols, each port being used for connecting to one peer device;
   at least one storage device for storing program instructions; and
   at least one processor for processing the program instructions to:
   configure the multiple ports of the switch;
   aggregate one or more ports running the same protocol into a sub-aggregated link; and
   form an aggregated link from multiple sub-aggregated links.

2. The switch of claim 1, the at least one processor for further processing the program instructions to:
   run, for each sub-aggregated link, a protocol of the corresponding sub-aggregated link; and
   control a protocol exchange between the corresponding sub-aggregated link and the peer device.

3. The switch of claim 2, the at least one processor for further processing the program instructions to:
   store a port member list of the aggregated link and information of a hash control during running.

4. The switch of claim 3, wherein the hash control during running is selected from a single-layer hash control and a multi-layer hash control.

5. The switch of claim 3, wherein in response to one of the multiple peer devices having failed the at least one processor further processing the program instructions to:
   perform a protocol exchange with the failed peer device;
   rewrite a port member list of the aggregated link and information of a hash control during running; and
   remove a connection with the failed peer device and run a new hash control.

6. The switch of claim 3, wherein in response to one of the multiple peer devices recovering from a failure the at least one processor further processing the program instructions to:
perform a protocol exchange with the peer device;
rewrite a port member list of the aggregated link and information of a hash control during running; and
re-add a connection with the peer device recovered from the failure and run a new hash control.

7. The switch of claim 1, the at least one processor for further processing the program instructions to:
configure a port member set of the switch and a protocol run by each port.

8. The switch of claim 1, wherein the peer device is a switch or a server.

9. The switch of claim 1, wherein the switch is a physical switch or a virtual switch.

10. A device for connecting to a switch, wherein the switch comprises multiple ports supporting different connection protocols, with each port being used for connecting to one peer device, the device comprising:
at least one storage device for storing program instructions; and
at least one processor for processing the program instructions to:
aggregate one or more ports running the same protocol in the switch into a sub-aggregated link; and
form an aggregated link from multiple sub-aggregated links.

11. The device of claim 10, the at least one processor for further processing the program instructions to:
run, for each sub-aggregated link, a protocol of the corresponding sub-aggregated link; and
control a protocol exchange between the corresponding sub-aggregated link and the peer device.

12. The device of claim 10, the at least one processor for further processing the program instructions to:
configure a port member set of the switch and a protocol run by each port.

13. The device of claim 10, wherein the device is selected from a third-party device, and one of the multiple servers.

14. A method for constructing an aggregated link, comprising:
configuring multiple ports of a switch supporting different connection protocols, each port being used for connecting to one peer device;
aggregating one or more ports running the same protocol in the switch into a sub-aggregated link; and
forming an aggregated link from multiple sub-aggregated links.

15. The method of claim 14, further comprising:
storing a port member list of the aggregated link and information of a hash control during running, wherein the hash control during running is selected from a single-layer hash control and a multi-layer hash control.

16. The method of claim 14, further comprising:
when one of the multiple peer devices has failed:
a protocol control unit of a sub-aggregated link where the failed peer device is located performs a negotiation with the peer device;
the protocol control unit notifies the failure to a control unit of the switch; and
the control unit rewrites a port member list of the aggregated link and information of a hash control during running, and notifies a basic running unit of the rewritten port member list and information of the hash control during running, so as to remove a connection with the failed peer device and run a new hash control.

17. The method of claim 14, further comprising:
when one of the multiple peer devices is recovered from a failure:
a protocol control unit of the sub-aggregated link where the peer device recovered from the failure is located performs a negotiation with the peer device;
the protocol control unit notifies the failure to a control unit of the switch; and
the control unit rewrites a port member list storing the aggregated link and information of a hash control during running, and notifies a basic running unit of the rewritten port member list and information of the hash control during running, so as to re-add a connection with the peer device recovered from the failure and run a new hash control.

18. The method of claim 14, wherein the switch is selected from a physical switch and a virtual switch.

19. The method of claim 14, wherein the method is run on one of the following: the switch, a third-party device, and one of multiple servers for establishing an aggregated link with the switch.

20. A computer program product comprising non-transitory computer readable storage media having program instructions embodied therewith, the program instructions executable by a processor to:
configure multiple ports of a switch supporting different connection protocols, each port being used for connecting to one peer device;
aggregate one or more ports running the same protocol in the switch into a sub-aggregated link; and
form an aggregated link from multiple sub-aggregated links.

* * * * *